United States Patent
Björk et al.

(10) Patent No.: US 10,301,063 B2
(45) Date of Patent: May 28, 2019

(54) PACKAGE MATERIAL AND PACKAGE CONTAINER FORMED WITH SAID MATERIAL

(71) Applicant: Tetra Laval Holdings & Finance S.A., Pully (CH)

(72) Inventors: Jonas Björk, Lund (SE); Håkan Hansson, Staffanstorp (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/538,244

(22) PCT Filed: Nov. 30, 2015

(86) PCT No.: PCT/EP2015/078102
§ 371 (c)(1),
(2) Date: Jun. 21, 2017

(87) PCT Pub. No.: WO2016/102150
PCT Pub. Date: Jun. 30, 2016

(65) Prior Publication Data
US 2018/0105354 A1    Apr. 19, 2018

(30) Foreign Application Priority Data

Dec. 22, 2014  (SE) .................................. 1451628

(51) Int. Cl.
*B65D 85/72*  (2006.01)
*B65D 5/70*  (2006.01)
(Continued)

(52) U.S. Cl.
CPC ............... *B65D 5/541* (2013.01); *B32B 5/02* (2013.01); *B32B 27/08* (2013.01); *B32B 27/10* (2013.01);
(Continued)

(58) Field of Classification Search
CPC ...... B65D 85/72; B65D 5/065; B65D 5/5405; B65D 5/541; B65D 5/701; B32B 5/02;
(Continued)

(56) References Cited

U.S. PATENT DOCUMENTS 2,085,200 A * 6/1937 Ljungstrom ........... B65D 17/16
220/270
4,501,375 A * 2/1985 Katsura ................ B65D 17/165
220/260
(Continued)

FOREIGN PATENT DOCUMENTS

DE   10 2008 002853   12/2009
EP        0267526      5/1988
(Continued)

OTHER PUBLICATIONS

International Search Report PCT Application No. PCT/EP2015/078102 (3 pages).
(Continued)

*Primary Examiner* — Andrew D Perreault
(74) *Attorney, Agent, or Firm* — Finnegan, Henderson, Farabow, Garrett & Dunner LLP

(57) ABSTRACT

Package material comprises one or more layers of plastic laminate, a first side, a second side and an penetration area (40). Two weakening lines (30, 30*b*) extend from the penetration area (40) creating a space in between and thus forming an opening ( ) in the package material. The package material comprises a plastic opening device ( ), with a first and second portion ( ) attached to the first and second side, respectively and a material bridge ( ) penetrating through the penetration area (40). The second portion covers at least partly the penetration area and comprises a guiding portion ( ) extending from the penetration area (40) onto the space
(Continued)

adjacent and to the weakening lines (30, 30*b*) as to facilitate rupturing substantially along the at least one weakening line.

15 Claims, 2 Drawing Sheets

(51) Int. Cl.
*B65D 5/54* (2006.01)
*B65D 5/06* (2006.01)
*B32B 27/12* (2006.01)
*B32B 27/10* (2006.01)
*B32B 27/08* (2006.01)
*B32B 5/02* (2006.01)

(52) U.S. Cl.
CPC .............. *B32B 27/12* (2013.01); *B65D 5/065* (2013.01); *B65D 5/5405* (2013.01); *B65D 5/701* (2013.01); *B65D 85/72* (2013.01); *B32B 2250/44* (2013.01); *B32B 2262/04* (2013.01); *B32B 2307/58* (2013.01); *B32B 2435/02* (2013.01); *B32B 2439/70* (2013.01)

(58) Field of Classification Search
CPC ......... B32B 27/08; B32B 27/10; B32B 27/12; B32B 2250/44; B32B 2262/04; B32B 2435/02; B32B 2307/58; B32B 2439/70
USPC .......................................................... 220/270
See application file for complete search history.

(56) References Cited

U.S. PATENT DOCUMENTS

| | | | |
|---|---|---|---|
| 4,811,848 A * | 3/1989 | Jud | .................... B65D 75/5838 383/205 |
| 4,828,138 A | 5/1989 | Andersson | |
| 5,029,752 A | 7/1991 | Andersson | |

FOREIGN PATENT DOCUMENTS

| | | |
|---|---|---|
| EP | 0279486 | 8/1988 |
| EP | 1145975 | 10/2001 |
| EP | 2889231 | 7/2015 |
| GB | 2003446 | 3/1979 |
| JP | S58-177324 | 11/1983 |
| JP | S60-115823 | 8/1985 |
| JP | S61-178327 | 11/1986 |
| WO | WO 00-17060 | 3/2000 |
| WO | WO 03-095199 | 11/2003 |
| WO | WO 2009-000927 | 12/2008 |
| WO | WO 2015-101427 | 7/2015 |
| WO | WO 2015-101481 | 7/2015 |

OTHER PUBLICATIONS

International-Type Search Report in corresponding Swedish Application 1451628-0 (8 pages).

* cited by examiner

PACKAGE MATERIAL AND PACKAGE CONTAINER FORMED WITH SAID MATERIAL

This is a National Phase of PCT Application No.PCT/EP2015/078102, filed Nov. 30, 2015, which claims the benefit of Swedish Application No 1451628-0filed Dec. 22, 2014, which is incorporated herein by reference.

The present invention relates to a package material and to a package container comprising such material.

BACKGROUND OF THE INVENTION

Package containers of the single use disposable type for food products are often produced from a packaging material. Such packaging material may include paperboard or carton, but may also just contain different plastic layer or metallized film layers. Consequently different kind of food products, like liquid, semi-liquid or solid food products can be stored in such containers.

One example is related to a simple bag, which can contain several plastic layer sealed together to form a bag like shape in order to store for example potato chips, candy or other solid food products. Some other containers are suitable for aseptic packaging of liquid foods such as milk, fruit juices etc, marketed and sold for long term ambient storage. The packaging material in such package container is typically a laminate comprising a bulk layer of paper or paperboard, outer, liquid-tight layers of thermoplastics, a gas barrier layer, most commonly an aluminum foil and finally one or more inside layers composed of one or several part layers, comprising heat-sealable adhesive polymers and/or heat-sealable polyolefins.

Package containers are normally produced and filled on fully automatic packaging machines. In one example, a continuous tube is formed from the web-fed packaging material (said material can include carton based material, but pure plastic laminate may also be suitable); the web of packaging material is sterilized in the packaging machine, and the sterilized web of packaging material is maintained in a closed, sterile environment in the subsequent step. The web is folded and sealed longitudinally to form a vertical tube. The tube is filled with the sterilized or sterile-processed food product, and is sealed and subsequently cut along equally spaced cross sections to form pillow packs, which are then folded mechanically to form respective finished, e.g. substantially parallelepiped-shaped, package containers.

Commonly, the package container have an opening device in order to facilitate consumer opening, many different types of opening devices including pull-tabs or molded opening devices, as for example discussed in WO03/095199 25 and WO/2009/000927.

However, the latter type of package is a high-volume (in terms of packages per time unit) and low-cost package (due to the properties of the packaging material), and such opening devices might hamper the production speed and be detrimental for the cost of the package.

For this reason there is a need for an opening device having a high efficiency in regard of the amount of material used and the time needed for production of each opening device.

SUMMARY OF THE INVENTION

For the purpose of the invention, the term "package material blank" or "blank" shall include an individual sheet or a blank in a package material web. Such package material web may comprise one or more "package material blanks" arranged after each other in a continuous web, some of those blanks in different processing stages, i.e. on one blank in such web may comprise an opening device, while other blanks on the web might still be unprocessed.

For the purpose of the invention, the terms "container, package" and "package" or "packaging container" refer to the same structure. In addition, the terms material, material laminate structure or packaging material refers to the package material blank. The term "cellulosic material" may comprise one or more layers of paper, cardboard or any other cellulosic fiber based material.

In an embodiment of the invention a package material comprises, a multilayer material structure has at least one layer of plastic laminate, a first side, a second side and a penetration area. The latter is defined in the multilayer material structure. Two weakening lines in the multilayer structure extend from or close from the penetration area thereby creating an area on the multilayer material structure in between, said area providing an opening in the multilayer material structure when being ruptured. The package material further comprises an opening device, preferable a plastic opening device. The opening devices comprises a first portion attached to the first side, a second portion attached to the second side and a material bridge penetrating the penetration area and connecting the first portion to the second portion.

In accordance with the present invention, the second portion at least partly covers the penetration area and comprises a guiding section extending from the penetration area and covering at least partly the area between and adjacent to the two weakening lines to facilitate rupturing of the multilayer structure along said weakening lines.

It was found that the rupture during opening of the package material does not always follow the weakening lines in the multilayer material structure, but rather tend to move inwards, i.e. into the area of the multilayer structure intended to form the opening. The guiding section extends into the area intended to form the opening and fills substantially the space between the two weakening lines at least along a portion of the two weakening lines. As the plastic material provides additional stability, the rupture follows the weakening line but cannot deviate inwards any longer.

For this purpose, the guiding section may have a distance to the two weakening lines in a range of 50 to 1500 µm and preferable between 500 and 1500 µm and more preferable between 3000 and 1000 µm. In case the weakening lines are curved, for example in an s-shaped manner having increasing and decreasing distances, the guiding section may follow the curved weakening lines. The guiding section may follow the first and weakening lines continuously, overlapping the whole area between the two weakening lines. It may also follow the weakening lines to their respective ends, but can also be shorter. Due to the plastic material disposed between the weakening lines, a displacement of the rupturing into the area between the weakening lines is effectively mitigated.

The weakening lines may include a perforation with alternating perforated portions and material bridge portions. The material used for the second portion may also cover partly the perforation or weakening lines, particularly the weakening lines close to the penetration area. It may be useful if the material ends on a material bridge portion of the perforation.

In a further embodiment, the second portion comprises a recess extending adjacent to one of the first and second weakening lines towards an area overlapping the penetration area. In other word, the recess may be disposed close to the material bridge portion. The recess in the second portion facilitates the initial rupturing and reduces the force required to perform the initial rupture. As the recess adjoins the weakening lines, the rupturing will continue form the recess in the second portion into the weakening lines.

In a further embodiment, the recess extends continuously across the penetration area from one location adjacent to the first weakening line to a location adjacent to the second weakening line. In this regard, the recessed material line may overlap with a portion of the first and/or second weakening line covered by the second portion. This will further simplify the rupturing process as weakening line and recess both support the rupture in a certain location. The initial rupturing force is further reduced.

The multilayer structure can have pure plastic layers only or several plastic layers and a cellulosic layer in between. According to an embodiment of the present invention, said cellulosic layer is absent in the penetration area. In other words, the penetration area comprises at least a layer less than in the surrounding area of the multilayer material structure and as such comprises a smaller vertical dimension than an area of the package material surrounding the penetration area.

The package material according to the present invention can be formed into a package, wherein said package material is shaped to form the container and sealed along side-edge portions. Further a first seal is arranged substantially opposite the opening device and at least a second seal is arranged substantially perpendicular to the opening device.

SHORT DESCRIPTION OF THE DRAWINGS

In the following the invention will be explained in greater detail supported by several embodiments using the accompanying drawings, in which FIG. 1 illustrates a perspective view of a package material with an opening device attached in accordance with a first embodiment;

DETAILED DESCRIPTION

Figure 1:
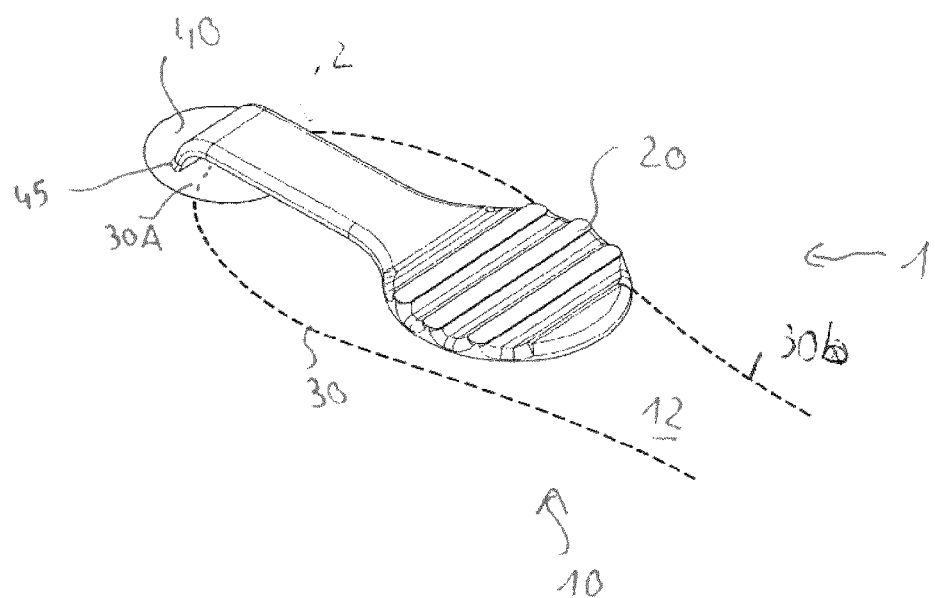

FIG. 1 illustrates a perspective view of a first embodiment of a package material in accordance with the present invention. The multilayer material structure 0 comprises several plastic layers (not shown) and comprises on its surface two weakening lines 30 and 30*b*, respectively. Both are shaped in an s-curved like manner and arranged opposite to each other, such that their distance between is first increasing till a maximum distance and then decreasing again. The multilayer comprises a penetration area 40, in which the thickness of the area is reduced compared to the surrounding area of the multilayer material structure. This is achieved by removing one or more layers in said penetration area during production of the multilayer material structure.

The two weakening lines, implemented at perforations start (or end depending on the direction of view) at the penetration area. The exact location of the starting point may vary and strongly influences the opening force, when the multilayer material structure is being ruptured. In this embodiment, the weakening lines start at a location, at which the distance between the starting points of the first and second weakening line is smaller than the radius of the penetration area. The area 12 between the two weakening lines 30 and 30*a* is defined as the opening area, because the user will create an opening in that spot when the material is being ruptured. A virtual extension 30A across the penetration area 40 connects the two perforation lines to each other in a curved like manner.

An opening device 2 is arranged on the multilayer structure. The opening device comprises a structured grip portion 20 and a bridge portion penetrating through the multilayer material structure in the penetration area. The penetration of material bridge 45 spot lies outside an area given by a virtual extension 30A of the starting point for the perforation lines 30*a* and 30.

Figure 2:
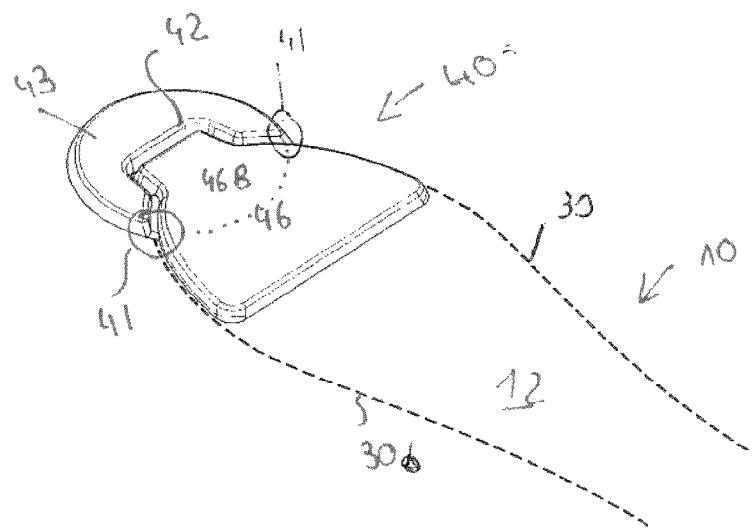
FIG. 2 shows the perspective bottom view of the embodiment according to FIG. 1.

Turning now to the bottom perspective view of the embodiment according to the present invention in FIG. 2. The opening device comprises a second portion 400 attacked to the lower side of the multilayer structure material. Said second portion 400 includes an extension section 43 separated by recess 42 from a guiding section 46. Parts of the guiding section 46 cover the penetration area, as the recess 42 connects in locations 41 to the respective perforation lines and extends over the penetration area, covered here by extension 43, recess 42 and part of guiding portion 46. Guiding portion 46 also covers part of the opening area 12. In particular it follows the perforation lines 30 and 3*b* substantially parallel until the distance between the two perforation lines reaches approximately its respective maximum.

The recess 42 in the second portion 400 of the opening device is deep enough to one the one side not create a huge resistance when being ruptured and on the other hand provide enough stability and thickness not to be accidentally damaged (e.g by dropping a package made from such material). The recess overlaps also an area of the material bridge 45, creating a potential initial rupturing area.

Figure 3:
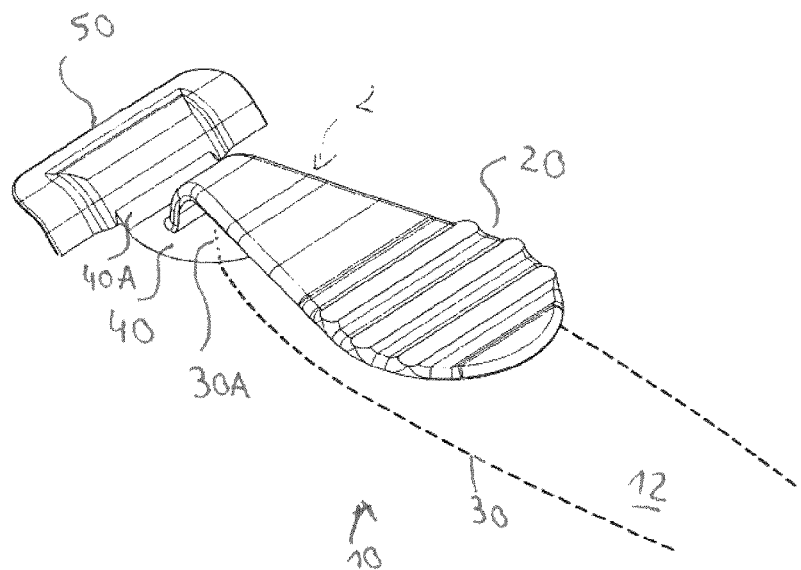
FIG. 3 illustrates another embodiment in accordance with the present invention.
Figure 4:
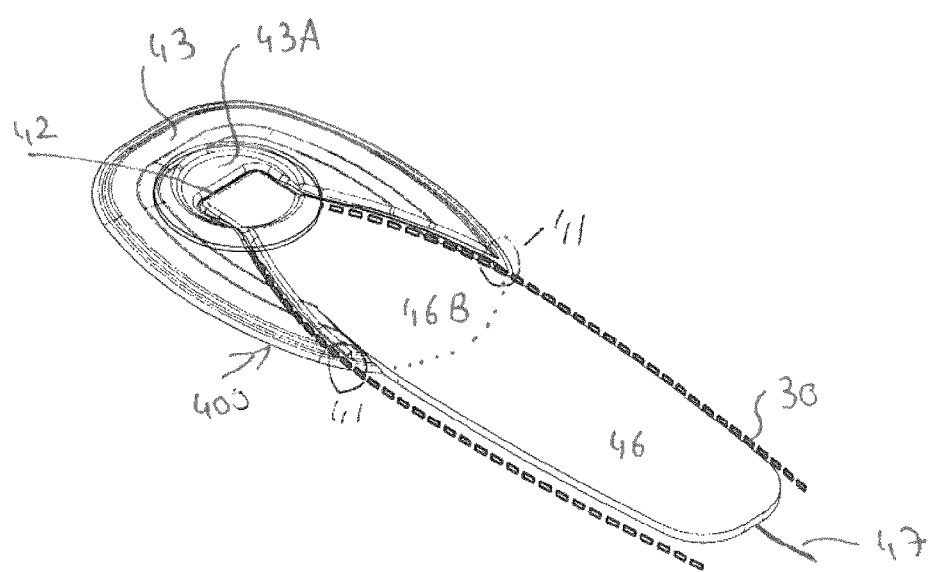
FIG. 4 shows the bottom view of the embodiment of FIG. 3.

FIG. 3 illustrates another embodiment of the present invention. In this embodiment, opening device 2 also contains a pouring support 50 on the first side. Said pouring support is like the whole opening device manufactured during an injection molding process, in which plastic material is pressed at high pressures through the penetration area, causing the material from the penetration area t rip apart and bend up. This is shown by element 40A, a small portion of the penetration area bend up, when the material for the pouring support is injected.

Compared to the previous embodiment, the two perforation lines 30, 30*b* are arranged closer together, having less distance to each other and consequently start at locations on the penetration area 40 significantly smaller than the radius of the penetration area 40 itself. The material bridge is arranged substantially on a center line of the penetration area.

Second portion 400 of the opening device comprises a much larger extension area 43 now covering not only the penetration area 43A, but also some of the surrounding areas of the multilayer material structure. This will improve stability in said area during the rupturing process. Recess 42 extends all across the extension area 43 and separates extension area 43 from the guiding area 46, 46B. Recess 42 overlaps part of the perforation lines 30A and 30 and adjoins the perforations 30, 30*b* at locations 41. The overlap ensures a guided rupturing along the perforation lines when creating the opening.

The guiding portion 46 extends substantially all along the perforation lines to facilitate the guided opening. An end portion 47 is attached to guiding portion 46 at its very end and outlasts the perforation lines 30 and 30b, respectively.

Features of the different embodiment illustrates herein can be combined in every way without deviating from the principle of guiding the rupturing during the opening process with the help of guiding portion attached on one side of the package. In the embodiments shown, the guiding portion is attached to the lower side of the multilayer structure, opposite the grip portion. However, the guiding portion can also be implemented on the same side as the grip portion without deviating from the disclosed principle and within the scope of the claimed subject matter. In other words, the second portion can comprise the grip portion and the guiding portions, while it is connected via the material bridge to the first portion, said first portion formed on the "inside" of the package.

The invention claimed is:

1. A package material, comprising:
   a multilayer material structure having one or more layers of plastic laminate, the multilayer material structure comprising:
      a first side and a second side opposite the first side;
      a penetration area defined in the multilayer material structure; and
      two weakening lines in the multilayer material structure, each of the two weakening lines extending from the penetration area and creating an area on the multilayer material structure between the two weakening lines, said area providing an opening in the multilayer material structure when being ruptured; and
   an opening device, the opening device comprising:
      a first portion [17a] attached to the first side;
      a second portion [19] attached to the second side; and
      a material bridge [17] penetrating through the penetration area and connecting the first portion to the second portion,
      wherein the second portion [19] at least partly covers the penetration area and further comprises a guiding section extending from the penetration area and continuously covering at least a portion of the area between the two weakening lines, where said portion extends from the penetration area until a distance between the weakening lines substantially reaches a maximum, to facilitate rupturing of the multilayer structure along said weakening lines.

2. The package material according to claim 1, wherein an outer edge of the guiding section comprises a distance to the respective two weakening lines in a range of 50 to 1500 μm.

3. The package material according to claim 1, wherein the two weakening lines are curved and a distance between the two weakening lines are increasing in a first section and are decreasing in a second section.

4. The package material according to claim 1, wherein the two weakening lines comprise a perforation having alternating perforated portions and material bridge portions.

5. The package material according to claim 4, wherein a material of the second portion partly covers the perforation.

6. The package material according to claim 5, wherein the material of the second portion ends on a material bridge portion of the perforation.

7. The package material according to claim 1, wherein the second portion comprises a recessed material line extending from a location of the second portion adjacent to one of the two weakening lines towards at least one of an area covering the penetration area or an area adjacent to the material bridge.

8. The package material according to claim 7, wherein the recessed material line extends continuously from each location of the second portion adjacent to each of the weakening lines.

9. The package material according to claim 7, wherein the recessed material line partly overlaps with a portion of at least one of the first or the second weakening line covered by the second portion.

10. The package material according to claim 1, wherein the multilayer structure of the area defined by the two weakening lines comprises a cellulosic layer, the cellulosic layer being absent in the penetration area.

11. The package material according to claim 1, wherein the penetration area comprises a smaller vertical dimension than a dimension of an area of the package material surrounding the penetration area.

12. The package material according to claim 1, wherein the penetration area] comprises at least one of:
   an area larger than an area covered by the material bridge;
   a substantial circular shape;
   a substantial rectangular shape; and
   the multilayer material structure in the penetration area having at least one layer less than the multilayer material structure of a surrounding area.

13. A package container formed of the package material of claim 1, wherein:
   said package material comprises side edge portions; and
   said package material is shaped as to form the container and sealed along said side edge portion.

14. The package material according to claim 2, wherein the distance is preferably between 500 and 1500 μm.

15. The package material according to claim 2, wherein the distance is preferably between 300 and 1000 μm.

* * * * *

UNITED STATES PATENT AND TRADEMARK OFFICE
CERTIFICATE OF CORRECTION

PATENT NO. : 10,301,063 B2
APPLICATION NO. : 15/538244
DATED : May 28, 2019
INVENTOR(S) : Jonas Björk and Håkan Hansson Page 1 of 1

It is certified that error appears in the above-identified patent and that said Letters Patent is hereby corrected as shown below:

On the Title Page

In Item (57) titled "Abstract," Line 5, "( )" should be deleted.

In Item (57) titled "Abstract," Line 6, "( )" should be deleted.

In Item (57) titled "Abstract," Line 7, "( )" should be deleted.

In Item (57) titled "Abstract," Line 8, "( )" should be deleted.

In Item (57) titled "Abstract," Line 11, "( )" should be deleted.

In the Claims

In Claim 1, Column 5, Line 33, "[17a]" should be deleted.

In Claim 1, Column 5, Line 34, "[19]" should be deleted.

In Claim 1, Column 5, Line 35, "[17]" should be deleted.

In Claim 1, Column 5, Line 38, "[9]" should be deleted.

Signed and Sealed this
Third Day of December, 2019

Andrei Iancu
*Director of the United States Patent and Trademark Office*